United States Patent
Markov et al.

(10) Patent No.: US 11,067,420 B2
(45) Date of Patent: Jul. 20, 2021

(54) SENSOR FOR DETERMINING AT LEAST ONE PARAMETER OF A FLUID MEDIUM STREAMING THROUGH A MEASURING CHANNEL

(71) Applicant: Robert Bosch GmbH, Stuttgart (DE)

(72) Inventors: Alexander Markov, Stuttgart (DE); Edda Sommer, Stuttgart (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 375 days.

(21) Appl. No.: 15/566,451

(22) PCT Filed: Feb. 29, 2016

(86) PCT No.: PCT/EP2016/054206
§ 371 (c)(1),
(2) Date: Oct. 13, 2017

(87) PCT Pub. No.: WO2016/165868
PCT Pub. Date: Oct. 20, 2016

(65) Prior Publication Data
US 2018/0120138 A1     May 3, 2018

(30) Foreign Application Priority Data
Apr. 15, 2015   (DE) .......................... 102015206708.4

(51) Int. Cl.
*G01F 1/684*      (2006.01)
*G01F 15/12*      (2006.01)
*G01F 1/692*      (2006.01)

(52) U.S. Cl.
CPC ............ *G01F 1/6842* (2013.01); *G01F 1/692* (2013.01); *G01F 15/12* (2013.01)

(58) Field of Classification Search
CPC ... G01F 1/56; G01F 1/64; G01F 15/12; G01F 1/692; G01F 1/6842
(Continued)

(56) References Cited

U.S. PATENT DOCUMENTS 3,625,058 A * 12/1971 Endress .............. G01F 23/2967
                                               310/323.21
4,030,359 A * 6/1977 Stapler ...................... G01F 1/10
                                               73/861.92
(Continued)

FOREIGN PATENT DOCUMENTS

| CN | 102918366 A | 2/2013 |
| CN | 202800199 U | 3/2013 |

(Continued)

OTHER PUBLICATIONS

International Search Report dated Jun. 3, 2016, of the corresponding International Application PCT/EP2016/054206 filed Feb. 29, 2016.
(Continued)

*Primary Examiner* — Robert R Raevis
(74) *Attorney, Agent, or Firm* — Norton Rose Fulbright Us LLP; Gerard Messina

(57) ABSTRACT

A sensor for determining at least one parameter of a fluid medium, in particular an induction air-mass flow of an internal combustion engine, flowing through a measuring channel. The sensor has a sensor housing, in particular a plug-in sensor, which is introduced or may be introduced into a flow pipe and in which the measuring channel is developed, and at least one sensor chip, disposed in the measuring channel, for determining the parameter of the fluid medium. The sensor housing has a plurality of channel walls, which delimit the measuring channel. The sensor chip is situated on a sensor carrier. At least in the region of the sensor carrier, at least a first channel wall of the plurality of channel walls and a second channel wall of the plurality of
(Continued)

channel walls, which differs from the first channel wall, or the sensor carrier have at least partly magnetic properties.

12 Claims, 2 Drawing Sheets

(58) Field of Classification Search
USPC ............ 73/204.21, 19.01–19.11, 23.3–23.33,
73/24.02–31.06, 335.01–335.14,
73/61.41–61.49, 61.71–61.75, 64.56, 661,
73/861.08–861.26, 861.351–861.357,
73/202–204.27, 861.42–861.64,
73/114.32–114.37, 204.11–204.27,
73/861–861.94, 195–271, 861.79–861.84,
73/861.86–861.94
See application file for complete search history.

(56) References Cited

U.S. PATENT DOCUMENTS

| | | | | |
|---|---|---|---|---|
| 4,312,235 | A * | 1/1982 | Daigle | G01F 1/48 |
| | | | | 73/861.18 |
| 4,399,696 | A * | 8/1983 | Feller | G01F 1/115 |
| | | | | 73/195 |
| 6,701,781 | B1 * | 3/2004 | Lutowsky, Jr. | G01F 1/6842 |
| | | | | 73/204.25 |
| 7,459,905 | B2 * | 12/2008 | Kurumado | G01D 5/147 |
| | | | | 324/174 |
| 2003/0094041 | A1 * | 5/2003 | Iwaki | G01F 1/6842 |
| | | | | 73/204.21 |
| 2009/0126508 | A1 * | 5/2009 | Kuhlemann | G01F 1/115 |
| | | | | 73/861.94 |
| 2011/0036157 | A1 * | 2/2011 | Opitz | G01F 1/6842 |
| | | | | 73/114.34 |
| 2013/0008263 | A1 * | 1/2013 | Kabasawa | G01F 1/383 |
| | | | | 73/861.42 |
| 2013/0269419 | A1 | 10/2013 | Etherington et al. | |
| 2014/0118161 | A1 * | 5/2014 | Jiang | H04Q 9/00 |
| | | | | 340/870.02 |
| 2015/0168196 | A1 * | 6/2015 | Wagner | F02D 41/187 |
| | | | | 73/114.32 |
| 2016/0041015 | A1 * | 2/2016 | Sheverev | G01F 1/74 |
| | | | | 73/777 |

FOREIGN PATENT DOCUMENTS

| | | |
|---|---|---|
| DE | 10253691 A1 | 6/2003 |
| DE | 102005057574 A1 | 6/2007 |
| DE | 102005057575 A1 | 6/2007 |
| DE | 112012002327 T5 | 3/2014 |
| EP | 2072973 A1 | 6/2009 |
| WO | 2015189029 A1 | 12/2015 |

OTHER PUBLICATIONS

Konrad Reif (Publ.): Sensoren im Kraftfahrzeug [Sensors in the Motor Vehicle] 1st Edition 2010, pp. 146-148.

* cited by examiner

SENSOR FOR DETERMINING AT LEAST ONE PARAMETER OF A FLUID MEDIUM STREAMING THROUGH A MEASURING CHANNEL

BACKGROUND INFORMATION

Numerous conventional methods and devices for determining a streaming characteristic of fluid media, i.e., fluids and/or gases, are available. In principle, the streaming characteristics may involve any physically and/or chemically measurable properties that qualify or quantify a flow of the fluid medium. In particular, it may involve a flow velocity and/or a mass flow and/or a volume flow.

Below, the present invention is described in particular with reference to what is known as hot-film air-mass sensors as described in Konrad Reif (Publ.): Sensoren im Kraftfahrzeug [*Sensors in the Motor Vehicle*], $1^{st}$ edition 2010, pages 146-148, for example. Hot-film air-mass sensors of this type are generally based on a sensor chip, in particular a silicon sensor chip, which includes a sensor diaphragm as a measuring surface or sensor region, across which the streaming fluid medium is able to flow. Generally, the sensor chip includes at least one heating element as well as at least two temperature sensors, which are situated on the measuring surface of the sensor chip, for example. A mass flow and/or a volume flow of the fluid medium is able to be inferred from an asymmetry of the temperature profile, which is affected by the flow of the fluid medium and detected by the temperature sensors. Generally, hot-film air-mass sensors are developed as plug-in sensors, which are able to be introduced into a flow pipe either in a permanent or an exchangeable manner. For example, this flow pipe may be an induction tract of an internal combustion engine.

A partial flow of the medium flows through at least one main channel provided in the hot-film air-mass sensor. A bypass channel is developed between the inlet and the outlet of the main channel. The bypass channel is especially developed in such a way that it includes a curved section for diverting the partial flow of the medium that has entered through the inlet of the main channel; in the further course, the curved section transitions into a section in which the sensor chip is situated. The latter section constitutes the actual measuring channel in which the sensor chip is situated.

In conventional hot-film air-mass sensors of the type described, a sensor carrier having the sensor chip mounted or introduced thereon usually projects into the measuring channel. For example, the sensor chip may be glued into the sensor carrier or glued onto it. The sensor carrier, for instance, may form a unit with a bottom plate of metal, onto which an electronics system, an actuation and evaluation circuit (e.g., having a circuit carrier, especially a circuit board) may be glued. The sensor carrier is able to be developed as an injection-molded plastic component of an electronics module, for instance. The sensor chip and the actuation and evaluation circuit, for example, may be connected to one another with the aid of bonding connections. The electronics module created in this manner can be glued into a sensor housing, for instance, and covers may seal the entire plug-in sensor.

In practice, hot-film air-mass sensors of this type must satisfy a multitude of demands. Apart from the goal of reducing a pressure drop at the hot-film air-mass sensor with the aid of suitable hydrodynamic developments, one of the main challenges consists of further improving the signal quality as well as the robustness of the devices with regard to contamination by oil and water droplets as well as by soot, dust and other solid matter particles. For example, this signal quality refers to a mass flow of the medium through the measuring channel leading to the sensor chip, and possibly to the reduction of signal drift and the improvement in the signal-to-noise ratio. For example, the signal drift refers to the deviation of the mass flow of the medium in the sense of a change in the characteristics-curve relationship between the actually occurring mass flow and the signal to be output, which was ascertained within the scope of the calibration during the production. When ascertaining the signal-to-noise ratio, the sensor signals that are output in rapid time succession are evaluated, whereas the drift of the characteristics curve and signal relates to a change in the average value.

German Patent Application No. DE 10 2005 057 574 A1 describes a hot-film air-mass sensor featuring a gradient-field oil deposition.

German Patent Application No. DE 10 2005 057 575 A1 describes a hot-film air-mass sensor featuring an electrical oil deposition.

Despite the numerous advantages of the conventional methods for avoiding a contamination of the sensor element by dust particles, for example, there still is room for improvement. For example, particles carrying an electrical charge and impinging upon the sensor chip are kept away from the sensor chip only to an insufficient degree.

SUMMARY

In accordance with the present invention, an example sensor for determining at least one parameter of a fluid medium streaming through a channel is provided, which avoids the disadvantages of known methods and strategies at least for the most part, and in which an improved function is able to be ensured in that the sensor is more robust with respect to contamination while its production is simultaneously more economical than that of previous sensors.

The sensor according to the present invention for determining at least one parameter of a fluid medium streaming through a channel, in particular an induction air-mass flow of an internal combustion engine, includes a sensor housing, in particular a plug-in sensor, which is introduced or is able to be introduced into a flow pipe and in which the measuring channel is developed; it also includes at least one sensor chip, disposed inside the measuring channel, for determining the parameter of the fluid medium. The sensor housing has a plurality of channel walls that delimit the measuring channel. The sensor chip is disposed on a sensor carrier. In the region of the sensor carrier, as a minimum, parts of at least a first channel wall of the plurality of channel walls, and a second channel wall of the plurality of channel walls that differs from the first channel wall, or the sensor carrier have magnetic properties.

The part of the channel walls and of the sensor carrier that has magnetic properties defines a region that has an effect on the possible accumulation of dirt within the above-described meaning. At least a first channel wall in at least this particular region has at least partly magnetic properties. It is possible that the first channel wall also has at least partly magnetic properties outside the near region of the sensor carrier. In addition, a second channel wall, which differs from the first channel wall, or the sensor carrier itself has at least partly magnetic properties.

A channel wall within the scope of the present invention basically describes any component that delimits the channel structure and especially the measuring channel. The channel wall may be part of the sensor housing and/or part of a measuring channel cover for sealing the channel structure developed in the sensor housing.

Magnetic properties within the framework of the present invention describe the property that manifests itself as an action of force between magnets, magnetized or magnetizable objects, and moved electrical charges. The transmission of this force takes place via a magnetic field that is generated by these objects. Within the scope of the present invention, when referring to at least partly magnetic properties, this means that magnetic properties need not necessarily be exhibited by the entire component but only by a part of such a component.

The first channel wall and the second channel wall or the sensor carrier may be designed to develop a magnetic field perpendicular to a main flow direction of the fluid medium in the measuring channel in at least the region of the sensor carrier. For example, if the channel walls have magnetic components, then they generate a magnetic field, regardless of where they are located.

Without further indications, the main flow direction within the scope of the present invention is basically to be understood as the local flow direction of the medium at the location of the sensor, and local irregularities such as turbulence, for example, may be disregarded. In particular, the main flow direction may thus denote the local, averaged transport direction of the streaming fluid medium at the location of the sensor system. The averaged transport direction refers to a transport direction in which the fluid medium predominantly flows averaged over time.

The sensor carrier may include a top surface, and the sensor chip may be embedded in the top surface. The sensor chip may especially be embedded in the top surface in such a way that the sensor chip ends flush with the top surface. The first channel wall and the second channel wall or the sensor carrier may be developed to form a magnetic field perpendicular to the top surface at least in the region of the sensor carrier.

The first channel wall is facing the sensor chip. In other words, the first channel wall points toward the sensor chip and lies across from it. The measuring channel has an essentially square design in cross-section; rounded corners and other geometrical elements may be process- or design-related and are therefore not considered for this form definition. An upper and a lower channel wall therefore result, as well as—in the flow direction—a right and left channel wall that delimit the flow. Upper and lower channel walls may have magnetic properties, the lower channel wall facing away from the sensor chip projecting into the flow. Now, a first upper and a second lower channel wall as well as further channel walls may have magnetic properties. The first channel wall and the second channel wall of the plurality of channel walls may have at least partly magnetic properties, the second channel wall facing away from the sensor chip. In other words, in one specific embodiment in which the first channel wall and the second channel wall have the magnetic properties, the second channel wall faces an underside of the sensor carrier and is situated opposite from it.

The magnetic properties may be realized in that the first channel wall and the second channel wall or the sensor carrier are at least partly made of a magnetic material. In particular, the first channel wall and the second channel wall or the sensor carrier are able to be at least partly produced from a ferromagnetic material. Able to be used in this context are plastic materials that are filled with magnetic particles, such as samarium cobalt or strontium ferrite. Polybutylene terephthalate (PBT) may be used for the matrix.

For example, the first channel wall and the second channel wall or the sensor carrier may be at least partly made from plastic and a ferromagnetic material. The ferromagnetic material may be embedded in the plastic in the form of particles. As an alternative, the ferromagnetic material may be embedded in the plastic in the form of an insertion part.

Within the framework of the present invention, the sensor carrier may be wholly or partly developed as a circuit carrier, in particular as a circuit board, or it may be part of a circuit carrier, and in particular of a circuit board. For example, the circuit carrier, and especially the circuit board, may have an appendix which forms the sensor carrier and which projects into the channel, e.g., the measuring channel of a hot-film air-mass sensor. The remaining part of the circuit carrier, and especially of the circuit board, is able to be to be accommodated in an electronics space in a housing of the sensor, for instance.

A circuit board within the framework of the present invention is generally to be understood as an essentially plate-shaped element that is also able to be utilized as a carrier of electronic structures such as circuit traces, terminal contacts or similar items, and which preferably also includes one or a plurality of such structures. At least minor deviations from the plate shape are basically also possible in this context and should be included in the term. For example, the circuit board may be produced from a plastic material and/or a ceramic material such as an epoxy resin, and in particular from a fiber-reinforced epoxy resin. In particular, the circuit board may be developed in the form of a circuit board having circuit traces, for example, especially printed circuit traces (PCB).

This allows for a considerable simplification of the electronics module of the sensor system and, for example, makes a bottom plate and a separate sensor carrier dispensable. Bottom plate and sensor carrier are able to be replaced by a single circuit board on which an actuation and evaluation circuit of the sensor system, for example, may be situated, either as a whole or in part. This actuation and evaluation circuit of the sensor system is used for actuating the at least one sensor chip and/or for evaluating the signals generated by this sensor chip. By combining said elements, the production expense of the sensor system is able to be lowered considerably, and the required space for the electronics module is able to be reduced to a great extent.

The sensor may in particular include at least a housing, and the channel is developed in the housing. For example, the channel may include a main channel and a bypass or measuring channel, and the sensor carrier and the sensor chip may be disposed in the bypass or measuring channel, for example. In addition, the housing may have an electronics space, which is separated from the bypass channel, the electronics module or the circuit board essentially being accommodated in the electronics space. The sensor carrier may then be developed as an appendix of the circuit board that projects into the channel. This system is technically relatively easy to realize, in contrast to the conventional complex electronics modules.

Especially in cases in which a circuit board is used as a sensor carrier but also in other cases and/or when using other media as a sensor carrier, the sensor carrier may at least partially be developed as a multilayer sensor carrier. For example, the sensor carrier may be developed in what is known as multilayer technology and include two or more carrier layers that are connected to one another. For instance, these carrier layers may in turn be produced from a metal, a plastic or a ceramic material or from a composite material and be connected to one another by joining methods such as bonding, for example.

In this case, in which a multilayer technology is used with multiple sensor layers of the sensor carrier, the inflow edge may be at least partially developed in a stepped manner through different dimensioning of the carrier layers counter to the main flow direction of the fluid medium. In this manner, the profiles are able to be realized in an at least approximated stepped manner. For example, it is thereby possible to form profiles that have a rectangular shape or—approximated by a stepped form—at least approximately round, rounded or wedge-shaped profiles in a sectional plane perpendicular to the extension plane of the sensor carrier. The sensor chip may be situated on or in the sensor carrier in such a way that it is aligned perpendicular to the local main direction of flow. The sensor chip may be developed in a rectangular shape, for example, and one side of this rectangle is disposed perpendicular, or essentially perpendicular, to the local main direction of flow, for instance at an alignment that deviates by no more than 10 degrees from the perpendicular line.

The sensor chip is able to be electrically contacted via at least one electrical connection. For example, the sensor carrier, in particular a circuit board forming the sensor carrier or an appendix of this circuit board, may have one or a plurality of circuit traces and/or contact pads, which are connected to corresponding contacts on the sensor chip, e.g., by a bonding method. In this case, the electrical connection is able to be protected and separated from the fluid medium by at least one cover. In particular, this cover may be developed as what is known as a glob top, e.g., as a plastic droplet and/or glue droplet, which covers the electrical connection such as the bonding wires. In this way, in particular also influences on the flow by the electrical connection are able to be reduced since the glob top has a smooth surface.

Furthermore, the sensor chip may include at least one sensor region. This sensor region, for example, may be a sensor surface made produced from a porous ceramic material, for instance, and/or, in particular, a sensor diaphragm. The streaming fluid medium is able to flow across the sensor diaphragm as a measuring surface or sensor region. For example, the sensor chip includes at least one heating element as well as at least two temperature sensors, which are situated on the measuring surface of the sensor chip, for instance; one temperature sensor is supported upstream from the heating element, and the other temperature sensor is supported downstream from the heating element. A mass flow and/or a volume flow of the fluid medium is able to be inferred from an asymmetry of the temperature profile, which is affected by the flow of the fluid medium and detected by the temperature sensors.

In accordance with the present invention, materials are used that have magnetic properties such as magnetic plastic materials. The fluid to be measured with the aid of the sensor, e.g., air, is frequently contaminated by particles. These particles are usually electrically charged. In a magnetic field, these particles are subjected to a Lorentz force and are deflected transversely to the movement direction and the magnetic field lines. Magnetically active region disposed in the flow region of the sensor chip may be developed in such a way that magnetic substances are introduced directly above and below the sensor chip or also in the plane of the sensor chip itself, i.e., in the sensor carrier, these magnetic substances being aligned in such a way that a magnetic field comes about transversely to the main flow direction of the fluid medium flowing across the sensor chip. This is able to be realized by adding ferromagnetic material to the plastic or with the aid of a magnetic insertion part. Special contacting of these regions is not required. The inflowing particles are deflected transversely and thus carried out of the sensing region, which, free of foreign substances or at least free of charged particles, is thus able to measure air masses flowing through according to its characteristics curve relation. An increase in the robustness of the sensors may thereby be expected.

BRIEF DESCRIPTION OF THE DRAWINGS

Additional optional details and features of the present invention result from the description below of preferred exemplary embodiments, which are schematically shown in the figures.

DETAILED DESCRIPTION OF EXAMPLE EMBODIMENTS

Figure 1:
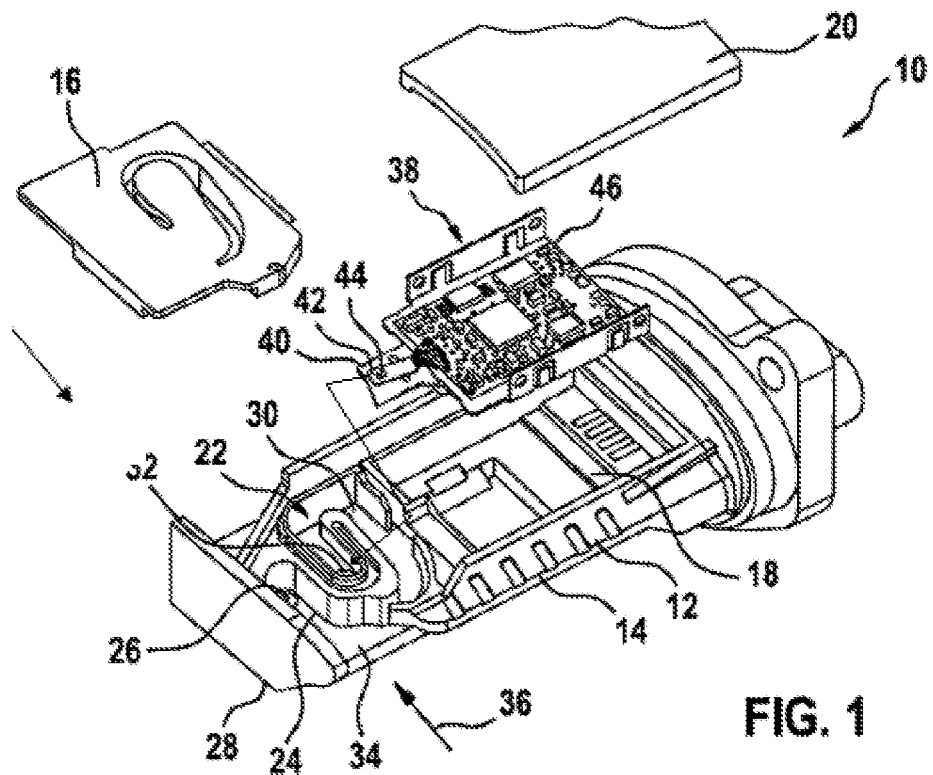
FIG. 1 shows a perspective view of a sensor.

FIG. 1 shows a perspective view of a sensor system 10 for determining a parameter of a fluid medium. Sensor system 10 is developed as a hot-film air-mass sensor and includes a sensor housing 12, developed as a plug-in sensor, which is able to be plugged into a flow pipe, in particular into an induction tract of an internal combustion engine, for example. Sensor housing 12 has a housing body 14, a measuring channel cover 16, an electronics space 18 as well as an electronics space cover 20 for sealing electronics space 18. A channel structure 22 is developed in housing body 16. Channel structure 22 has a main channel 24, which terminates in a main flow outlet 26, such as on underside of sensor housing 12 in relation to the illustration in FIG. 1. It also has a bypass or measuring channel 30 that branches off from main channel 24 and terminates in a bypass or measuring channel outlet 32, which may be developed separately or also in an integrated fashion. A representative quantity of the fluid medium is able to flow through channel structure 22 via an inlet opening 34, which points counter to a main flow direction 36 of the fluid medium at the location of sensor housing 12 in the inserted state.

Figure 2:
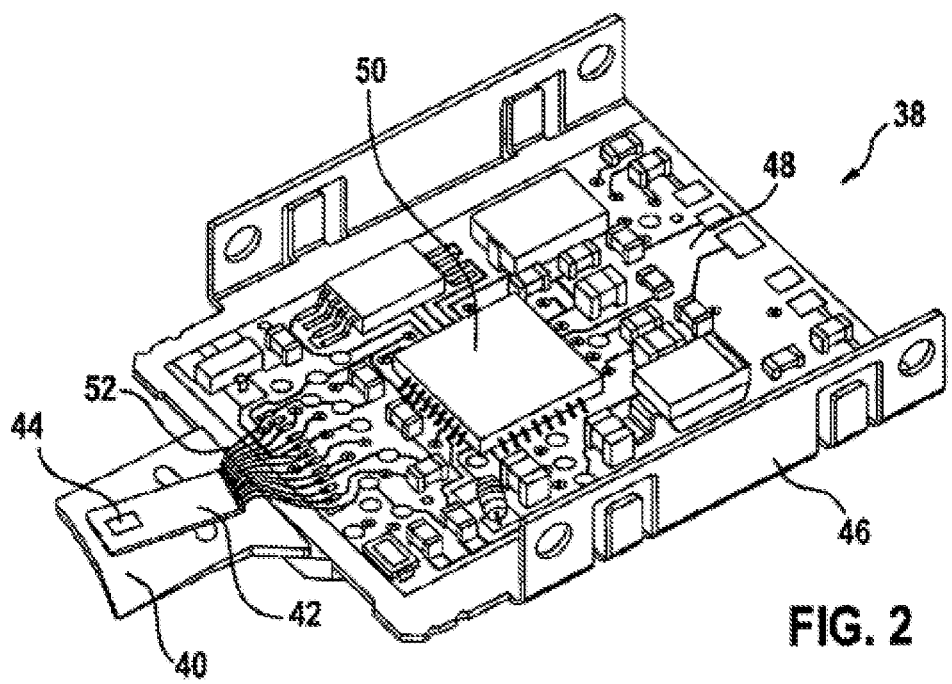
FIG. 2 shows an enlarged view of an electronics module of the sensor.

FIG. 2 shows an enlarged representation of an electronics module 38 of sensor system 10. When electronics module 38 is inserted, a sensor carrier 40 projects into measuring channel 30. A sensor chip 42 is embedded in this sensor carrier 40 in such a way that the fluid medium is able to flow across a micromechanical sensor diaphragm, which is developed as a sensor region 44 of sensor chip 42. Sensor carrier 40 together with sensor chip 42 is part of electronics module 38. In addition, electronics module 38 has a curved bottom plate 46 as well as a circuit board 48, which is applied thereon, e.g., glued, and which includes an actuation and evaluation circuit 50. Sensor chip 42 is electrically connected to actuation and evaluation circuit 50 via electrical connections 52, which are realized as wire bonds in this instance. Electronics module 38 created in this manner is introduced, e.g., bonded, into electronics space 18 of housing body 14, which in turn is a fixed component of sensor housing 12. Sensor carrier 40 projects into channel structure 22. Electronics space 18 is subsequently sealed by electronics space cover 20.

As shown in FIG. 1, sensor housing 12 has a plurality of channel walls 54, 56, 58, 60, which delimit measuring channel 30. For example, sensor housing 12 has a first channel wall 54, which is a part or section of measuring channel cover 16, a second channel wall 56, which is a part or section of a base of sensor housing 12, for instance, as well as a third channel wall 58 and a fourth channel wall 60, which delimit measuring channel 30 on the side.

Figure 3:
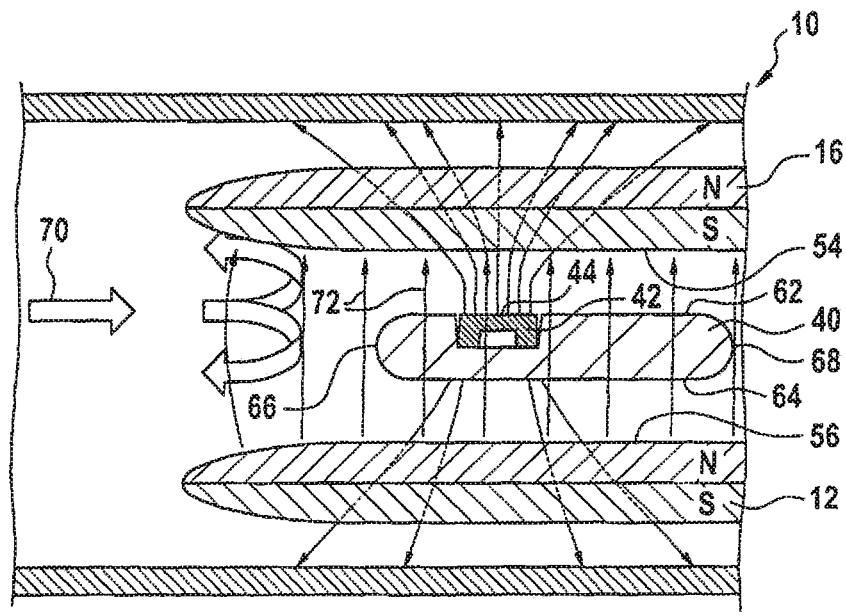
FIG. 3 shows a cross-sectional view of a sensor according to a first specific embodiment.

FIG. 3 shows a cross-sectional view of sensor 10 according to a first specific embodiment. Sensor carrier 40 has a top surface 62, an underside 64, an incoming flow edge 66, and a forward flow edge 68. Incoming flow edge 66 is pointing in the direction of or toward a main flow direction 70 of the fluid medium in measuring channel 30. Sensor chip 42 is embedded in top surface 62. First channel wall 54 is facing sensor chip 42. In other words, first channel wall 54 lies across from sensor chip 42 or across from top surface 62 of sensor carrier 40. Second channel wall 56 is facing away from sensor chip 42. Put another way, second channel wall 56 faces underside 64 or lies across from it.

At least in the region of sensor carrier 40, at least first channel wall 54 and second channel wall 56 have at least partly magnetic properties. When referring to the region of sensor carrier 40, this is to be understood as describing that first channel wall 54 and second channel wall 56 have magnetic properties in at least the particular region that extends parallel to a dimension of sensor carrier 40 from inflow edge 66 to forward flow edge 68, when viewed in main flow direction 70 of the fluid medium in measuring channel 30. It is understood that first channel wall 54 and second channel wall 56 may also have magnetic properties in regions that extend beyond said region of sensor carrier 40, for instance in a region of 1 mm to 50 mm upstream from inflow edge 66 in relation to main flow direction 70 of the fluid medium in measuring channel 30, and/or in a region of 1 mm to 50 mm downstream from forward flow edge 68 in relation to main flow direction 70 of the fluid medium in measuring channel 30. This may be realized in that first channel wall 54 and second channel wall 56 are at least partially produced from a magnetic material. More precisely, first channel wall 54 and second channel wall 56 are at least partially produced from a ferromagnetic material. First channel wall 54 and second channel wall 56, for example, are at least partially made of plastic and a ferromagnetic material. The ferromagnetic material is embedded in the plastic in the form of particles. As an alternative, the ferromagnetic material may be embedded in the plastic material in the form of an insertion part (not shown further).

First channel wall 54 and second channel wall 56 are therefore developed to generate a suitable magnetic field 72 perpendicular to main flow direction 70 of the fluid medium in measuring channel 30 in at least the region of sensor carrier 40. More specifically, first channel wall 54 and second channel wall 56 are developed to generate a suitable magnetic field 72 perpendicular to top surface 62 in at least the region of sensor carrier 40. Electrically charged particles that are moving in main flow direction 70 are subjected to a Lorentz force in magnetic field 72 and are deflected perpendicular to main flow direction 70 and magnetic field lines of magnetic field 72. With regard to the view of FIG. 3, the Lorentz force is acting perpendicular to the sectional plane, i.e., into or out of the drawing planes. This deflects electrically charged particles away from sensor region 44, i.e., into or out of the drawing plane depending on the resulting charge, see FIG. 3.

Figure 4:
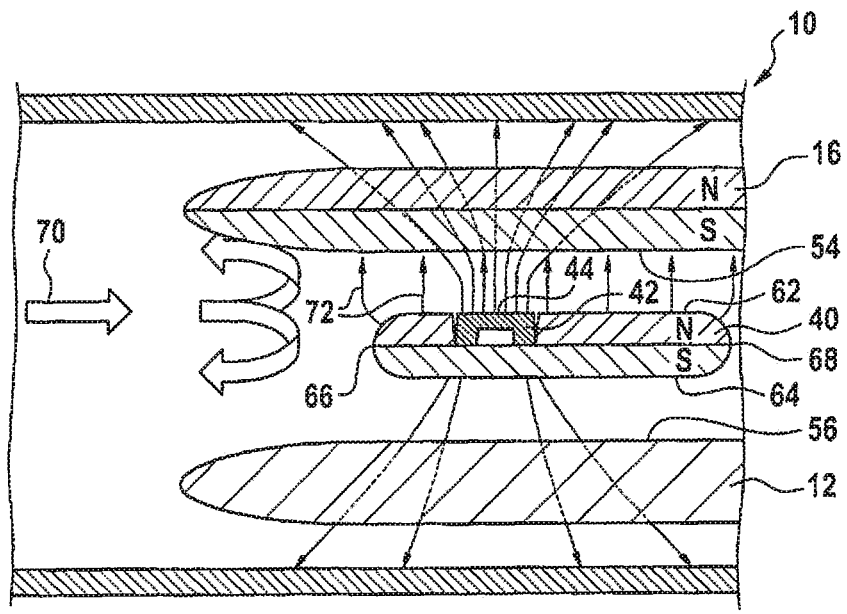
FIG. 4 shows a cross-sectional view of a sensor according to a second specific embodiment.

FIG. 4 shows a cross-sectional view of sensor 10 according to a second specific embodiment. In the following text, only the differences from the first specific embodiment are described, and matching components have been provided with matching reference numerals. In sensor 10 of the second specific embodiment, sensor carrier 40 has at least partly magnetic properties of its own instead of second channel wall 58. This may be realized by producing first channel wall 54 and sensor carrier 40 at least partially from a magnetic material. More specifically, first channel wall 54 and sensor carrier 40 are at least partially made of a ferromagnetic material. First channel wall 54 and sensor carrier 40, for example, are at least partially produced from plastic and a ferromagnetic material. The ferromagnetic material is embedded in the plastic in the form of particles. As an alternative, the ferromagnetic material may be embedded in the plastic material in the form of an insertion part (not shown further)

First channel wall 54 and sensor carrier 40 are thereby disposed to generate a suitable magnetic field 72 perpendicular to main flow direction 70 of the fluid medium in measuring channel 30 in at least the region of sensor carrier 40. More precisely, first channel wall 54 and sensor carrier 40 are disposed to generate a suitable magnetic field 72 perpendicular to top surface 62 in at least the region of sensor carrier 40. Electrically charged particles that are moving in main flow direction 70 are subjected to a Lorentz force in magnetic field 72 and are deflected perpendicular to main flow direction 70 and magnetic field lines of magnetic field 72. With regard to the view of FIG. 4, the Lorentz force is acting perpendicular to the sectional plane, i.e., into or out of the drawing planes. This deflects electrically charged particles away from sensor region 44, i.e. into or out of the drawing plane depending on the resulting charge, see FIG. 4.

The invention claimed is:

1. A sensor for determining at least one parameter of a fluid medium streaming through a measuring channel, the sensor comprising:
   a plug-in sensor housing which is introduced or able to be introduced into a flow pipe and in which the measuring channel is situated; and
   at least one sensor chip, disposed in the measuring channel, to determine the at least one parameter of the fluid medium;
   wherein the plug-in sensor housing has a plurality of channel walls which delimit the measuring channel, the sensor chip being situated on a sensor carrier at least in a region of the sensor carrier; and
   wherein one of: (i) at least a first channel wall of the plurality of channel walls and a second channel wall of the plurality of channel walls, which differs from the first channel wall, at least partly have magnetic properties, wherein the first channel wall is a part or a section of a measuring channel cover, or (ii) the sensor carrier at least partly has magnetic properties,
   wherein the sensor carrier has a top surface, the sensor chip being embedded in the top surface such that the sensor chip ends flush with the top surface.

2. The sensor as recited in claim 1, wherein the sensor is for determining an induction air-mass flow of an internal combustion engine.

3. The sensor as recited in claim 1, wherein one of: (i) the first channel wall and the second channel wall, or (ii) the sensor carrier, are developed to generate a magnetic field perpendicular to a main flow direction of the fluid medium in the measuring channel as well as perpendicular to a plane of the sensor region, at least in the region of the sensor carrier.

4. The sensor as recited in claim 1, wherein the first channel wall faces the sensor chip.

5. The sensor as recited in claim 1, wherein the first channel wall and the second channel wall of the plurality of channel walls have at least partially magnetic properties, the second channel wall facing away from the sensor chip.

6. The sensor as recited in claim 1, wherein one of: (i) the first channel wall and the second channel wall, or (ii) the sensor carrier, are at least partially produced from a magnetic material.

7. The sensor as recited in claim 1, wherein one of: (i) the first channel wall and the second channel wall, or (ii) the sensor carrier, are at least partially produced from a ferromagnetic material.

8. The sensor as recited in claim 1, wherein one of: (i) the first channel wall and the second channel wall, or (ii) the sensor carrier, are at least partially produced from plastic and a ferromagnetic material.

9. The sensor as recited in claim 1, wherein the second channel wall is a part or a section of a base of the sensor housing.

10. A sensor for determining at least one parameter of a fluid medium streaming through a measuring channel, the sensor comprising:
    a plug-in sensor housing which is introduced or able to be introduced into a flow pipe and in which the measuring channel is situated; and
    at least one sensor chip, disposed in the measuring channel, to determine the at least one parameter of the fluid medium;
    wherein the plug-in sensor housing has a plurality of channel walls which delimit the measuring channel, the sensor chip being situated on a sensor carrier at least in a region of the sensor carrier; and
    wherein one of: (i) at least a first channel wall of the plurality of channel walls and a second channel wall of the plurality of channel walls, which differs from the first channel wall, at least partly have magnetic properties, wherein the first channel wall is a part or a section of a measuring channel cover, or (ii) the sensor carrier at least partly has magnetic properties,
    wherein the sensor carrier has a top surface, the sensor chip being embedded in the top surface, and one of: (i) the first channel wall and the second channel wall, or (ii) the sensor carrier, are developed to generate a magnetic field perpendicular to the top surface in at least a region of the sensor carrier.

11. A sensor for determining at least one parameter of a fluid medium streaming through a measuring channel, the sensor comprising:
    a plug-in sensor housing which is introduced or able to be introduced into a flow pipe and in which the measuring channel is situated; and
    at least one sensor chip, disposed in the measuring channel, to determine the at least one parameter of the fluid medium;
    wherein the plug-in sensor housing has a plurality of channel walls which delimit the measuring channel, the sensor chip being situated on a sensor carrier at least in a region of the sensor carrier; and
    wherein one of: (i) at least a first channel wall of the plurality of channel walls and a second channel wall of the plurality of channel walls, which differs from the first channel wall, at least partly have magnetic properties, wherein the first channel wall is a part or a section of a measuring channel cover, or (ii) the sensor carrier at least partly has magnetic properties,
    wherein one of: (i) the first channel wall and the second channel wall, or (ii) the sensor carrier, are at least partially produced from plastic and a ferromagnetic material,
    wherein the ferromagnetic material is embedded in the plastic in the form of particles.

12. A sensor for determining at least one parameter of a fluid medium streaming through a measuring channel, the sensor comprising:
    a plug-in sensor housing which is introduced or able to be introduced into a flow pipe and in which the measuring channel is situated; and
    at least one sensor chip, disposed in the measuring channel, to determine the at least one parameter of the fluid medium;
    wherein the plug-in sensor housing has a plurality of channel walls which delimit the measuring channel, the sensor chip being situated on a sensor carrier at least in a region of the sensor carrier; and
    wherein one of: (i) at least a first channel wall of the plurality of channel walls and a second channel wall of the plurality of channel walls, which differs from the first channel wall, at least partly have magnetic properties, wherein the first channel wall is a part or a section of a measuring channel cover, or (ii) the sensor carrier at least partly has magnetic properties,
    wherein one of: (i) the first channel wall and the second channel wall, or (ii) the sensor carrier, are at least partially produced from plastic and a ferromagnetic material,
    wherein the ferromagnetic material is embedded in the plastic in the form of an insertion part.

\* \* \* \* \*